(Model.)
G. F. BURTON.
COVER FOR FILTERS AND PERCOLATORS.
No. 284,606. Patented Sept. 11, 1883.
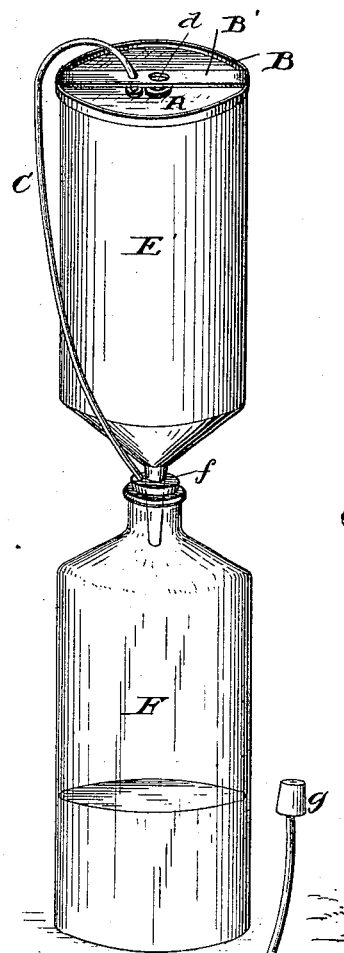
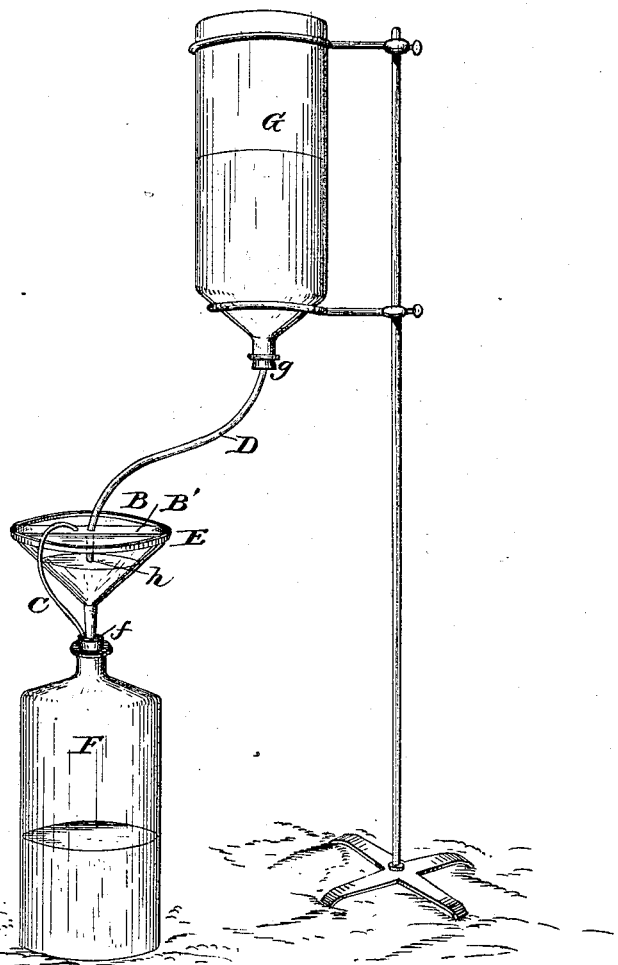
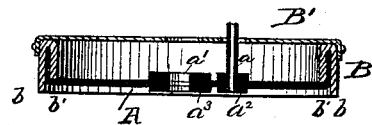
Witnesses.
Franck L. Ourand
Rex Smith
Inventor.
George F. Burton,
by A. M. Smith,
Attorney.

UNITED STATES PATENT OFFICE.

GEORGE F. BURTON, OF SPRINGFIELD, OHIO.

COVER FOR FILTERS AND PERCOLATORS.

SPECIFICATION forming part of Letters Patent No. 284,606, dated September 11, 1883.

Application filed January 24, 1883. (Model.)

*To all whom it may concern:*

Be it known that I, G. F. BURTON, of Springfield, county of Clarke, and State of Ohio, have invented new and useful Improvements in Covers for Filters and Percolators, of which the following is a full, clear, and exact description, reference being had to the accompanying drawings, making part of this specification.

My invention relates to a novel construction of cover for vessels used for purposes of filtering or percolation; and it consists in a cover made of soft rubber or equivalent pliable material impervious to water, and provided with a suitable supporting rim or frame, and with tubes or openings for the admission of air to supply the place of the diminishing volume of the menstruum in the filter or percolator, and also of an additional supply of the menstruum itself, if desired, for making the process continuous.

It is well known to those familiar with the preparation of liquid medical compounds, extracts, &c., that in the ordinary processes of filtering or percolation frequently material loss results from the rapid evaporation of the volatile and often expensive agents or ingredients employed, and that to avoid this loss or waste special and expensive forms of constructions of the vessels employed for such purposes have been devised; but this necessitated the keeping on hand of a supply of such vessels specially made for the purpose, and which for ordinary uses were not required.

The object of my improvement is to prevent the loss or waste referred to by a device enabling me to utilize the vessels in ordinary use for filtering and percolating purposes—such as funnels and single-mouthed bottles or vessels—as will be explained.

In the accompanying drawings, Figure 1 is a side elevation representing my improved cover applied to an ordinary filtering-funnel and receiving-vessel. Fig. 2 is a similar view, showing the addition of a fountain-supply vessel or reservoir for making the process of filtering or percolation practically continuous. Fig. 3 is a perspective view of my improved cover detached, and Fig. 4 represents a vertical section through said cover.

A represents a disk or circular piece of soft rubber or equivalent pliable material impervious to air or water, and secured at its edge or periphery to an annular frame or hoop, B, of metal or other suitable material, serving to hold it extended and under slight tension. This band or frame B is by preference made double, or in the form of two rings, $b\ b'$, one fitting within the other, and sufficiently snugly to adapt them to grasp and hold the edge of the rubber disk between them, as shown in Fig. 4. This annular frame is by preference provided with a cross-bar, B', extending diametrically across the upper face of the disk, and forming a central transverse support thereto, in line with one or more perforations, $a$ and $a'$, through said disk or cover A, coincident with similar perforations in the transverse bar B'. These perforations in the cover are for the purpose of admitting air to supply the place of the diminished volume of the menstruum in, and, where desired, for the introduction of an additional supply of such menstruum into, the filter or percolator, in a manner that will be explained. The cover A is provided with perforations $a$ and $a'$, having nipples $a^2\ a^3$ fitting therein, made of rubber or other suitable material, for facilitating the attachment of an air-tube, C, and the application of a cork, $d$, or supply-tube D, and, if desired, these nipples may be extended to penetrate the cross-bar, B', also for the same purpose. The cover thus constructed is connected by a flexible tube, C, with the cork or stopper $f$ of the receiving-vessel F through a suitable tube or opening therein for the reception of the discharge end of a filtering-funnel or percolator, as shown in Figs. 1 and 2. The receiving-vessel F being placed in the desired position, with its perforated cork or stopper in place, having the tube C, connected with the cover A, attached, the discharge end of the filtering or percolating vessel E or E' is placed therein, the latter being prepared and filled in any usual or preferred manner, and the cover A, with the opening $a'$ therein closed, is placed thereon. As the liquid in the filtering or percolating vessel escapes into the receiver the air in the latter is displaced and flows through the tube C into the filtering-vessel, supplying the place of the liquid escaping therefrom. The material of the cover A being soft and pliable, it fits the mouth of the filtering-funnel or percolating-vessel snugly, adapting itself to any little irregularity or unevenness of its edges, effectually cutting off communication of the contents of said vessel with the external atmosphere, and thus preventing evaporation.

Where it is desired to make the process of filtering or percolation continuous, the cork $d$ may be removed and an inverted supply-vessel, G, may be connected, through the opening $a'$, with the vessel E by a flexible tube, D, and perforated cork or stopper $g$, as shown in Fig. 2. In this arrangement the connection of the tube D with the cover A should be air-tight, and the end of the tube should project below the cover into the vessel E to a level with the point to which it is desirable to permit the liquid to rise therein, as indicated at $h$ in Fig. 2. As the liquid escapes from the vessel E to the receiver F the air passes from the latter through the tube C into the former, as above explained, and when the liquid in the filtering-vessel E drops below the mouth $h$ of the tube D therein said supply of air escapes through said tube D into the supply-vessel G, relieving the vacuum and permitting the liquid therein to flow down into the vessel E until it rises therein sufficiently to again close the mouth of the tube D, thereby stopping the flow of the liquid from the supply-vessel G. When the receiver F becomes filled, it may be readily removed and an empty one substituted therefor, and when the supply-vessel G becomes empty its place can be readily supplied by a full one, thus making the filtering or percolating process practically continuous, and this with the aid only of the vessels in ordinary use for the purposes specified, with my improved cover applied as described.

Having now described my invention, what I claim as new is—

1. A flexible perforated disk or cover for filters and percolators, provided with means for facilitating the attachment of one or more flexible tubes, in combination with a supporting rim or frame, for the purpose and substantially as described.

2. As a new article of manufacture, the flexible perforated disk or cover for filters and percolators, provided with the supporting rim or frame, and the flexible tubes C and D, provided with the perforated stoppers $f$ and $g$, substantially as and for the purposes described.

3. The flexible cover A, provided with a supporting-frame, B, and air-tube C, in combination with the filtering or percolating vessel, and receiver F, arranged and operating substantially as described.

4. The cover of flexible material, provided with tubes C and D, in combination with the filtering or percolating vessel, receiver, and supply-vessel, arranged and operating substantially as described.

In testimony whereof I have hereunto set my hand this 19th day of January, A. D. 1883.

GEORGE F. BURTON.

Witnesses:
WILLIAM W. WILKERSON,
JOHN L. ZIMMERMAN.